US012674880B2

(12) United States Patent　　　(10) Patent No.:　US 12,674,880 B2
Marshall　　　　　　　　　　　　　(45) Date of Patent:　　　Jul. 7, 2026

(54) SYSTEM, DEVICE, AND METHOD FOR ESTIMATING POSITION INFORMATION WITH RESPECT TO AT LEAST ONE TARGET NODE

(71) Applicant: Stichting IMEC Nederland, Eindhoven (NL)

(72) Inventor: Chris Marshall, Waalre (NL)

(73) Assignee: Stichting IMEC Nederland, Eindhoven (NL)

(*) Notice: Subject to any disclaimer, the term of this patent is extended or adjusted under 35 U.S.C. 154(b) by 307 days.

(21) Appl. No.: 18/312,300

(22) Filed: May 4, 2023

(65) Prior Publication Data

US 2023/0358874 A1　　　Nov. 9, 2023

(30) Foreign Application Priority Data

May 5, 2022　　(EP) ..................................... 22171710

(51) Int. Cl.
　　*G01S 13/36*　　　　(2006.01)
　　*G01S 5/02*　　　　(2010.01)
(52) U.S. Cl.
　　CPC ............ *G01S 13/36* (2013.01); *G01S 5/0218* (2020.05); *G01S 5/0273* (2013.01)
(58) Field of Classification Search
　　None
　　See application file for complete search history.

(56) References Cited

U.S. PATENT DOCUMENTS

| 5,173,710 | A | 12/1992 | Kelley et al. |
| 10,757,675 | B2 | 8/2020 | Seth et al. |
| 2007/0281622 | A1* | 12/2007 | Nishimura ............. H04B 17/18 |
| | | | 455/67.11 |

(Continued)

FOREIGN PATENT DOCUMENTS

| CN | 111983559 A | 11/2020 |
| CN | 113777641 A | 12/2021 |

(Continued)

OTHER PUBLICATIONS

Extended European Search Report and Search Opinion, Application No. EP 22171710.1, mailed Dec. 13, 2022, 13 pages.

(Continued)

*Primary Examiner* — Whitney Moore
(74) *Attorney, Agent, or Firm* — McDonnell Boehnen Hulbert & Berghoff LLP

(57)　　　　　　　ABSTRACT

A system for estimating position information with respect to at least one target node including for example two static nodes, at least one reference node, the at least one target node, and at least one processing unit. In this context, at least two of the at least two static nodes are configured each as a source for wirelessly transmitting at least signal fragments. Furthermore, at least two of the at least one reference node and the at least one target node are configured each as a receiver for wirelessly receiving the signal fragments from the at least two sources. In addition to this, the at least two receivers are configured to measure the phases of a set of common signal fragments from the at least two sources and to estimate position information with respect to the at least one target node on the basis of the phase measurements.

20 Claims, 8 Drawing Sheets

(56) References Cited

U.S. PATENT DOCUMENTS

| | | | |
|---|---|---|---|
| 2009/0322603 A1 | 12/2009 | Liao | |
| 2010/0309054 A1 | 12/2010 | Pichler et al. | |

FOREIGN PATENT DOCUMENTS

| | | | |
|---|---|---|---|
| EP | 2634593 | A1 | 9/2013 |
| EP | 1690108 | B1 | 10/2013 |
| EP | 3443386 | A2 | 2/2019 |
| EP | 3695243 | A1 | 8/2020 |
| JP | 2004333252 | A | 11/2004 |
| WO | 03/016940 | A2 | 2/2003 |
| WO | 03/016940 | A3 | 4/2003 |
| WO | 2017178573 | A2 | 10/2017 |
| WO | 2019072394 | A1 | 4/2019 |

OTHER PUBLICATIONS

Zhang, Ruonan, Jiawei Liu, Xiaojiang Du, Bin Li, and Mohsen Guizani. "AOA-based three-dimensional multi-target localization in industrial WSNs for LOS conditions." Sensors 18, No. 8 (2018): 2727.

Bialer, Oded, Dan Raphaeli, and Anthony J. Weiss. "Location estimation in multipath environments with unsynchronized base stations." In 2016 IEEE Sensor Array and Multichannel Signal Processing Workshop (SAM), pp. 1-5. IEEE, 2016.

Rinaldi, Stefano, Paolo Ferrari, Emiliano Sisinni, Alessandro Depari, and Alessandra Flammini. "An evaluation of low-cost self-localization service exploiting angle of arrival for industrial cyber-physical systems." In 2021 IEEE AFRICON, pp. 1-6. IEEE, 2021.

Zhao, Yinzhi, Jingui Zou, Jiming Guo, Gege Huang, and Lixian Cai. "A novel ultra-wideband double difference indoor positioning method with additional baseline constraint." ISPRS International Journal of Geo-Information 10, No. 10 (2021): 634.

LN Nguyen, Thu, Tuan D. Vy, and Yoan Shin. "An efficient hybrid RSS-AoA localization for 3D wireless sensor hetworks." Sensors 19, No. 9 (2019): 2121.

Facchi, Nicolo, Francesco Gringoli, Fabio Ricciato, and Andrea Toma. "Emitter localisation from reception timestamps in asynchronous networks." Computer Networks 88 (2015): 202-217.

Dumphart, Gregor, Erik Leitinger, Paul Meissner, and Klaus Witrisal. "Monostatic indoor localization: Bounds and imits." In 2015 IEEE International Conference on Communication Workshop (ICCW), pp. 865-870. IEEE, 2015.

Maróti, Miklós, Péter Völgyesi, Sebestyén Dóra, Branislav Kusý, András Nádas, Akos Lédeczi, György Balogh, and Károly Molnár. "Radio interferometric geolocation." In Proceedings of the 3rd international conference on Embedded hetworked sensor systems, pp. 1-12. 2005.

* cited by examiner

SYSTEM, DEVICE, AND METHOD FOR ESTIMATING POSITION INFORMATION WITH RESPECT TO AT LEAST ONE TARGET NODE

CROSS-REFERENCE TO RELATED APPLICATIONS

The present application is a non-provisional patent application claiming priority to European Patent Application No. EP 22171710.1, filed May 5, 2022, the contents of which are hereby incorporated by reference.

FIELD OF THE DISCLOSURE

The present disclosure relates to a system for estimating position information with respect to at least one target node, a device for estimating position information with respect to at least one target node, and a method for estimating position information with respect to at least one target node.

BACKGROUND

The widespread adoption of communication applications providing wireless connectivity capabilities, such as Internet-of-Things applications, results in a growing need of a system for estimating position information with respect to at least one target node, a device for estimating position information with respect to at least one target node, and a method for estimating position information with respect to at least one target node in order to allow such applications to be cost-effectively utilized for high-accuracy wireless positioning.

US 2010/0309054 A1 relates to a method for increasing the location accuracy for unsynchronized radio subscribers, in which phase evaluation is used to ascertain the position of a transmitter which is to be located. The transmitter to be located and a further transmitter, whose location is known, respectively send a sequence of N signals to at least two receivers, wherein the transmission channel to be used for transmitting a signal is varied, in line with the disclosure, on the basis of a prescribed, symmetrical hopping scheme. Disadvantageously, due to the symmetrical hopping scheme, it has to be scanned across a range of frequencies, which leads to increased efforts in the case of higher bandwidths and to a decreased accuracy in the case of lower bandwidths.

SUMMARY

The present disclosure provides a system for estimating position information with respect to at least one target node, a device for estimating position information with respect to at least one target node, and a method for estimating position information with respect to at least one target node, thereby ensuring less efforts and a particularly high accuracy.

In one example embodiment, a system for estimating position information is provided. The system comprises at least two static nodes, at least one reference node, at least one target node, and at least one processing unit. In this context, at least two, all, of the at least two static nodes are configured each as a source for wirelessly transmitting at least signal fragments, or each as a receiver for wirelessly receiving at least signal fragments. Additionally, at least two, all, of the at least one reference node and the at least one target node are configured each as a receiver for wirelessly receiving the signal fragments from the at least two sources in the case that at least two, all, of the at least two static nodes are configured each as a source, or each as a source for wirelessly transmitting the signal fragments to the at least two receivers in the case that at least two, all, of the at least two static nodes are configured each as a receiver. In addition to this, the at least two receivers are configured to measure the phases of a set of common signal fragments from the at least two sources. In further addition to this, the at least one processing unit is configured to estimate position information with respect to the at least one target node on the basis of the phase measurements of the at least two receivers. In some example embodiments, less effort and high accuracy can be achieved. In some example embodiments, due to the foregoing configuration, the usage of a single frequency, such as a single center frequency, may be sufficient. In some example embodiments, it is noted that the locations, precise locations, of the at least two static nodes have not to be known. In this context, the flexibility arises as will be explained with reference to the use of the reference node, the distance to or from the static node is relatively unimportant, and signals may be passing by a multipath route.

It is noted that position information may refer to a location in two-dimensional or three-dimensional space. Furthermore, the position information can be a vertical comparative distance (for instance, which floor, which shelf) or a horizontal comparative distance (for example, proximity to boundary) and/or direction (for instance, collision path).

It is further noted that the position information may relate to the relative position of the at least one target node with respect to the position of the at least one reference node.

In some example embodiments, at least one processing unit may be configured to use a model comprising information relating to the spatial variation of the phase of the signals from or to the at least two static nodes.

In this context, the information may relate at least to the direction of the spatial variation of the signal from or to the respective locality of interest from or to the at least two static nodes, and/or may include an estimate of the corresponding location and/or corresponding virtual location of the respective static node.

Furthermore, the information may relate at least to the direction of the spatial variation of the phase of the difference in the signal phase between signals from or to each of two static nodes.

Moreover, it is noted that the above-mentioned locality of interest may be the location of the at least one reference node, when the at least one reference node and the at least one target node are close.

With respect to the at least two static nodes, it is noted that static should be understood as static regarding a respective reference system. In this context, the reference system may exemplarily be means of transportation such as a car, an airplane, or a ship, which comprises the nodes. Additionally or alternatively, a static node can be understood as a node in a known position at the time and/or as a node being substantially stationary during measurement.

With respect to the signal fragments, it is noted that a signal fragment may last a limited period of time. Additionally or alternatively, a signal fragment can be a discontinuous part of a transmission sequence, such as a part of a TDMA (time-division multiple access) wireless signal.

Furthermore, a signal fragment may be substantially coherent for its duration at a constant carrier frequency. Additionally or alternatively, a set of signal fragments may have the same frequency or at least nearly the same frequency.

Moreover, a signal fragment may be identifiable by the at least two receivers by its occurrence, timing, frequency, modulation, coding, or any combination thereof. Additionally or alternatively, a signal fragment may have an uncertain or unknown phase relative to other signals or fragments. It is further noted that a signal fragment may originate from a wide band signal.

With respect to the above-mentioned set of common signal fragments from the at least two sources, it is noted that this may refer to a set of common signal fragments as received from the at least two sources.

With respect to the above-mentioned phase measurements, it is noted that the measurements may comprise or be the corresponding differences between the respective phase measurements.

In one example embodiment, at least a part of the phase measurements is based on the modulation of a corresponding signal, the difference in corresponding subcarriers, or the carrier of a corresponding signal. In some example embodiment, the disclosure can be used in a very flexible manner, which reduces costs and efforts.

With respect to the above-mentioned corresponding subcarriers, it is noted that it might be desirable if the corresponding subcarriers are used for the case, for instance, of an OFDM (orthogonal frequency-division multiplexing) signal or of a sequence of signals hopping at different frequencies.

In some example embodiments, the signal fragment may be a single transmission with a substantially constant center frequency, examples of such being a UWB (ultra-wideband) pulse, a modulated signal or an OFDM signal comprising a set of subcarriers as in OFDM.

For the sake of completeness, it is noted that a signal fragment can also be extended to any identifiable duration of signal transmission or transmissions, of which a phase can be measured. This can also include within the fragment a sequence of signals on different carriers, which together occupy a bandwidth (and so may have modulation and/or frequency differences between subcarriers transmitted at different times) and have an overall carrier frequency or mean carrier frequency, respectively.

It is further noted that in some embodiments measuring and employing the phase may be implemented, for example the mean carrier frequency with or without the phase difference between respective subcarriers, of a signal superfragment comprising a sequence of sub-fragments.

In some example embodiments, at least a part of the phase measurements is based on a multipath component. For example, a line-of-sight propagation is not required, which further increases accuracy. Further, the respective signal can be reflected and/or scattered between its transmission and reception. In this context, it is noted that an increased coverage may be realized which leads to the useful use of more signals over a larger area, thereby additionally improving accuracy.

It is noted that signal fragments may be associated with particular multipath components. For example, there may be a weak direct path (exemplarily attenuated by a wall) and a strong reflected path. These may both be observed by the respective target and by the respective reference.

Furthermore, in some example embodiment the respective common signal fragment may be identified and used for the corresponding phase measurements.

Moreover, a plurality of signal components can be used, originating from the same source but with different propagation paths between transmitter and receiver and therefore with different time of arrival, phase, and direction.

In this context, the respective receivers should be able to separate and identify each of the set of common signal fragments. It is noted that the common signal fragments may be seen as distinct components.

In this example, a UWB (ultra-wideband) receiver may be able to separate and measure the weak direct path fragment, and the strong multipath signal fragment. Additionally, in this case, the different signal paths are necessarily coherent to each other (as they arise from the same source and are measured by the same receiver).

In some example embodiments, the at least one processing unit is configured to subtract the phase measurements for forming differences between the corresponding signals from the at least two sources and/or between the at least two receivers in order to remove the effect of respective time and/or phase offsets. For instance, inaccuracies can further be reduced in this manner.

In some example embodiments, forming the differences results in a metric with a known ambiguity range, such as a metric of the corresponding phase difference. For example, position information can be estimated relative to the reference in a particularly efficient manner.

With respect to the corresponding phase difference, it might be particularly advantageous if the corresponding phase difference comprises or is a corresponding phase difference modulo two pi.

In some example embodiments, the at least two sources and/or the at least two receivers are configured to operate on the same frequency. Additionally or alternatively, the signal fragments are unsynchronized with respect to each other. For instance, not only efforts but also inaccuracies can further be reduced. Further, the same frequency can be used and/or a tight synchronization is not necessary.

In some example embodiments, the at least one reference node and/or the at least one target node and/or at least one of the at least two static nodes comprises the at least one processing unit. For example, processing can be within the nodes internally.

In some example embodiments, at least one, of the at least two static nodes comprises or is a beacon or an anchor or an access point. Additionally or alternatively, at least one, of the least one reference node and the at least one target node comprises or is a mobile or movable node, such as a mobile or movable user equipment, such as a mobile phone. For instance, the invention can flexibly and efficiently be used with common mobile communication infrastructures. Further, any node may participate in the positioning with multiple sets of deployed sets of nodes, for example, a particular node may be a static node for two or more pairs of static nodes, or a static node in one set may act as a reference node for another set, and vice versa.

With respect to the at least one reference node, it is noted that at least one, each, of the at least one reference node may be in a known location, in a location of interest, in the middle of a location of interest.

In some example embodiments, on the basis of the phase measurements regarding the at least two static nodes and the at least one reference node, the at least one processing unit is configured to create a model of the corresponding local phase variation for the at least one target node in the vicinity of the at least one reference node. For example, effects such as reflection and scattering marginally affect accuracy. In this context, it is noted that, if the model describes the local phase variation, then it takes into account the direction of the incident signals to or equivalently from the locality of interest, which may be a multipath component not following the direct path, and hence may still provide accurate positioning.

Further, the model may be defined for a known phase offset, such as zero offset, at the reference node, so that the reference node is associated with a known ambiguity range. The phase difference can then be used directly for local positioning relative of the target relative to the reference, in the vicinity of the reference device, without having to be concerned with the consequences of the respective ambiguity.

It is noted that the model may be created or supplemented by a survey of the respective observed phase differences at known positions in the corresponding locality of interest and/or a ray tracing model of the respective multipath signal components.

In some example embodiments, the model is described as a local phase difference gradient. For instance, complexity can be reduced, thereby ensuring less efforts.

In some example embodiments, the at least one processing unit is configured to use the model in the context of estimating the position information, relative position information of the at least one target node with respect to the at least one reference node. For example, the position is provided relative to the at least one reference node and does not rely on knowledge of distances with respect to the at least two static nodes, which leads to decreased efforts and an increased accuracy.

In some example embodiments, a device for estimating position information with respect to at least one target node is provided. The device comprises a wireless communication unit, and a processing unit connected to the wireless communication unit. In this context, the wireless communication unit is configured to communicate with at least two, all, of at least two static nodes being configured each as a source for wirelessly transmitting at least signal fragments, or each as a receiver for wirelessly receiving at least signal fragments. Additionally, the wireless communication unit is further configured to communicate with at least two, all, of at least one reference node and at least one target node being configured each as a receiver for wirelessly receiving the signal fragments from the at least two sources in the case that at least two, all, of the at least two static nodes are configured each as a source, or each as a source for wirelessly transmitting the signal fragments to the at least two receivers in the case that at least two, all, of the at least two static nodes are configured each as a receiver. In addition to this, the wireless communication unit is further configured to configure the at least two receivers to measure the phases of a set of common signal fragments from the at least two sources. In further addition to this, the wireless communication unit is further configured to receive the phase measurements of the at least two receivers. Further additionally, the processing unit is configured to estimate position information with respect to the at least one target node on the basis of the phase measurements of the at least two receivers.

In some example embodiments, at least one of the at least one reference node is embodied as a reference unit. In this context, the device comprises the reference unit.

In some example embodiments, a method for estimating position information with respect to at least one target node is provided. The method comprises the steps of configuring at least two, all, of at least two static nodes each as a source for wirelessly transmitting at least signal fragments, or each as a receiver for wirelessly receiving at least signal fragments, configuring at least two, all, of at least one reference node and the at least one target node each as a receiver for wirelessly receiving the signal fragments from the at least two sources in the case that at least two, all, of the at least two static nodes are configured each as a source, or each as a source for wirelessly transmitting the signal fragments to the at least two receivers in the case that at least two, all, of the at least two static nodes are configured each as a receiver, measuring the phases of a set of common signal fragments from the at least two sources with the aid of the at least two receivers, and estimating position information with respect to the at least one target node on the basis of the phase measurements of the at least two receivers with the aid of at least one processing unit.

With respect to the first step of the method, it is noted that the step, the explicit configuration of the transmissions, is not necessarily required.

In this context, a reference may observe the environment, and note the schedule of transmissions observable in its area. It may then instruct the target which fragments to measure, and/or measures them itself. After the measurements it may then receive the requested phase measurements from the target, and use these together with its own measurements and/or a model to estimate the target location.

In some example embodiments the target and reference measure (at least) the common set of fragments of at least two sources, and that the phases of a common set of fragments are compared to estimate position information.

Furthermore, the measurements (at the reference) and/or the model can also be passed to the target such as in the case that the target estimates its own location. With respect to some applications for scalability, large numbers of devices, target devices, can be handled. Further, privacy can be ensured with the aid of information about target location retained purely within the target itself.

In some example embodiments, at least a part of the phase measurements is based on the modulation of a corresponding signal, the difference in corresponding subcarriers, or the carrier of a corresponding signal.

BRIEF DESCRIPTION OF THE DRAWINGS

The above, as well as additional features will be better understood through the following illustrative and non-limiting detailed description, with reference to the appended drawings. In the drawings, like reference numerals will be used for like elements unless stated otherwise.

DETAILED DESCRIPTION

Figure 1A:
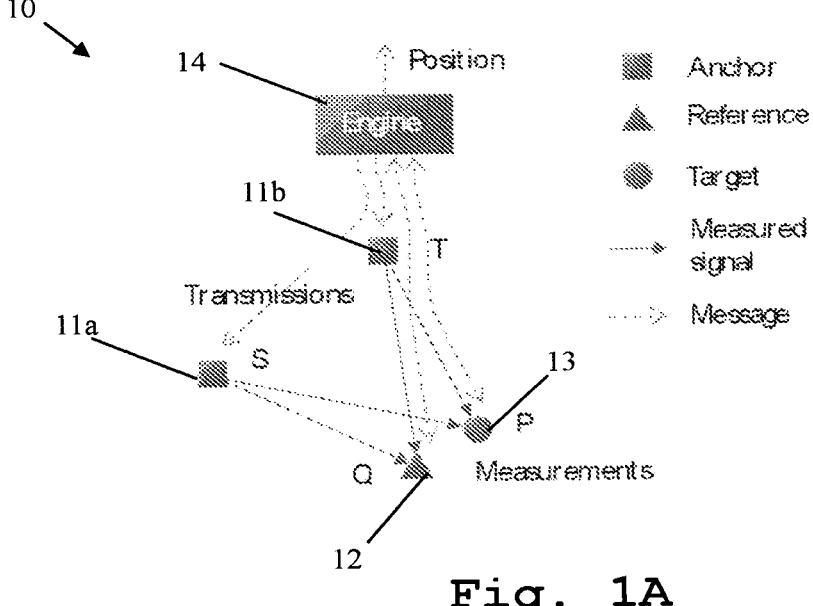
FIG. 1A shows a downlink configuration according to some example embodiments.
Figure 1B:
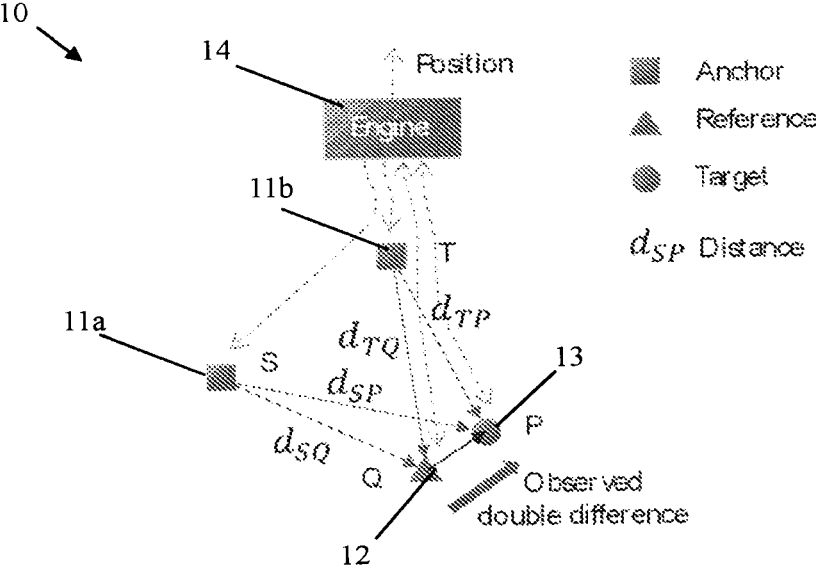
FIG. 1B illustrates the exemplary embodiment of FIG. 1A in the context of an observed double difference according to some example embodiments.

With respect to FIGS. 1A and 1B, an exemplary embodiment of a system 10 for estimating position information with respect to at least one target node, exemplarily the target node or target 13, respectively, is shown.

According to FIGS. 1A and 1B, the system 10 comprises at least two static nodes, exemplarily the two static nodes or anchors 11a and 11b, respectively, at least one reference node, exemplarily the reference node or reference 12, respectively, the target 13, and at least one processing unit, exemplarily the engine 14.

Due to the fact that FIGS. 1A and 1B exemplarily illustrate a downlink configuration for differential measurements relative to the local reference 12, all of the at least two static nodes 11a and 11b are configured each as a source for wirelessly transmitting at least signal fragments, and all of the at least one reference node 12 and the at least one target node 13 are configured each as a receiver for wirelessly receiving the signal fragments from the at least two sources.

For the sake of completeness, it is noted that for an uplink configuration, all of the at least two static nodes 11a and 11b are configured each as a receiver for wirelessly receiving at least signal fragments, and all of the at least one reference node 12 and the at least one target node 13 are configured each as a source for wirelessly transmitting the signal fragments to the at least two receivers.

Furthermore, the at least two receivers are configured to measure the phases of a set of common signal fragments from the at least two sources, and the at least one processing unit in the form of the engine 14, respectively, is configured to estimate position information with respect to the at least one target node or the target 13, respectively, on the basis of the phase measurements of the at least two receivers.

In some example embodiments, the reference node 12 may have similar functionality to the target node 13. Further, the reference 12 or the at least one reference node, respectively, may be placed in the area of interest. As already mentioned above, the system 10 may operate either as a downlink system with anchors 11a, 11b transmitting signal fragments and target node 13 and reference node 12 receiving, or as an uplink system, with target node 13 and reference node 12 transmitting.

In some example embodiments, the nodes need not be synchronized relative to each other. It is further noted that the corresponding signals may be time-varying and discontinuous, for instance, TDMA (Time Division Multiple Access) signals.

Generally, with respect to FIGS. 1A and 1B, it can be that multiple unsynchronized receivers measure the phases of a set of common signal fragments from multiple unsynchronized sources. In this context, each common signal fragment from a particular source is measured by more than one receiver. This allows the time and phase of the respective source to be cancelled in the later processing. In some example embodiments, there are multiple sources and signals that may provide enough measurements to cancel the unknown offsets.

It is noted that the signal fragments may be transmitted and/or measured concurrently or sequentially. Furthermore, the measurement by a receiver may be of a multipath component, rather than the direct line of sight signal.

Moreover, the various nodes may be assumed to operating on the same frequency ("syntronized") when transmitting the signals and making the phase measurements. Accordingly, their frequency may be common, but the timing and phase might be arbitrary. The nodes may be syntronized to each other or a common reference.

For the sake of completeness, it is noted that in practice, there may be small frequency offsets. This typically leads to a phase error, but the effect is negligible if the time span of the set of measurements is short. The effect can be corrected by further means, if necessary. It is further noted that the receiver(s) may need to maintain coherent operation over the period for which it measures a set of signal fragments from the set of multiple sources.

Furthermore, the respective phase measurement may be of the modulation of a signal, the difference in subcarriers, for example, for an OFDM (Orthogonal Frequency-Division Multiplexing) signal or a hopping Bluetooth signal, or the carrier of the signal (or set of signals) as a whole. Moreover, the respective measurement of the phase of the signal may be expressed in terms of phase, such as with amplitude, or by I and Q measurements expressing the angle and quality of the signal.

Now, in the context of FIG. 1B, the respective phase measurements of the signal fragments are subtracted to form the difference between signals, and between receivers, which removes the effect of time and phase offsets between the nodes. It is noted that the respective difference metric may contain ambiguities of $2\pi$. Furthermore, the corresponding differences between signals from different sources may be estimated by each receiver.

Then, the differences may be communicated to a positioning engine such as the engine 14 to form the difference between measurements by the set of receivers, which results in a metric of the phase difference. For the sake of completeness, it is noted that this difference is available after the transmission, communication, and subsequent joint processing of measurements.

In this context, it is noted that a receiver may form the difference between measurements of the phase of two signal fragments cancelling the phase offset of the receiver and share the result in minimizing communications cost.

Furthermore, the measurements by each receiver may then be differenced to cancel the phase offset of the transmitter.

Moreover, the waveform of the received signal fragments, exemplarily sets of IQ samples, from a particular source fragment may be brought together and their phase compared cancelling the phase offset of the source when the waveform is particularly ill-controlled and even arbitrary. The process may be repeated for the second signal and the difference obtained to cancel the phase offset of the receiver.

The above-mentioned difference forming is explained in greater detail in the following:

In this context, the nodes 11a, 11b, 12, and 13 may have offsets, phase offsets:

$\alpha_S$ (node 11a, also referred to as node S)
$\alpha_T$ (node 11b, also referred to as node T)
$\alpha_Q$ (node 12, also referred to as node Q)
$\alpha_P$ (node 13, also referred to as node P)

Then, the following applies for the respective transmissions by:

(anchor or static) node 11a at $\theta_S - \alpha_S$
(anchor or static) node 11b at $\theta_T - \alpha_T$ Accordingly, the respective propagation delays and/or phase shifts of interest are: $\zeta_{SP}$, $\zeta_{SQ}$, $\zeta_{TP}$, and $\zeta_{TQ}$ For instance, with respect to $\zeta_{SP}$, the following applies:

$$\zeta_{SP} = 2\pi \frac{d_{SP}}{\lambda} - 2\pi k_{SP}$$

In this context, it is noted that the foregoing expression $k_{SP}$ may be an integer resulting from the respective ambiguity in the phase measurement.

Furthermore, (reference) node Q measures with its offset:

$$\theta_S - \alpha_S + \zeta_{SQ} - \alpha_Q - 2\pi k_{SQ}$$

$$\theta_T - \alpha_T + \zeta_{TQ} - \alpha_Q - 2\pi k_{TQ}$$

Moreover, (reference) node Q forms the respective difference, cancelling its offset $\alpha_Q$:

$$\theta_S - \theta_T - (\alpha_S - \alpha_T) + \zeta_{SQ} - \zeta_{TQ} - 2\pi k_{ST,Q}$$

In this context, it is noted that the foregoing expression $k_{ST,Q}$ may be an integer arising from the corresponding subtraction, but also including the possibility of further wraparound and/or further plus or minus contribution as a result of the subtraction.

Similarly, the (target) node P also measures the signals from node S and T, and forms the difference, cancelling its offset $\alpha_P$:

$$\theta_S - \theta_T - (\alpha_S - \alpha_T) + \zeta_{SP} - \zeta_{TP} - 2\pi k_{ST,P}$$

Now, the respective double difference between (receiving) nodes P and Q cancels the transmitter offset or source offsets, respectively, $\alpha_S$ and $\alpha_T$ exemplarily in an downlink configuration, giving the useful metric:

$$\zeta_{SP} - \zeta_{TP} - (\zeta_{SQ} - \zeta_{TQ}) - 2\pi k_{ST,PQ} = \frac{2\pi}{\lambda}[(d_{SP} - d_{TP}) - (d_{SQ} - d_{TQ})]$$

In this context, it is noted that the distance difference $d_{SQ} - d_{TQ}$ is known. It is further noted that care should be exercised in the treatment of the ambiguity integer, which arises from the respective difference, but which may also have a further integer contribution as a result of a further plus or minus wraparound as a result of the respective subtraction.

Figure 5:
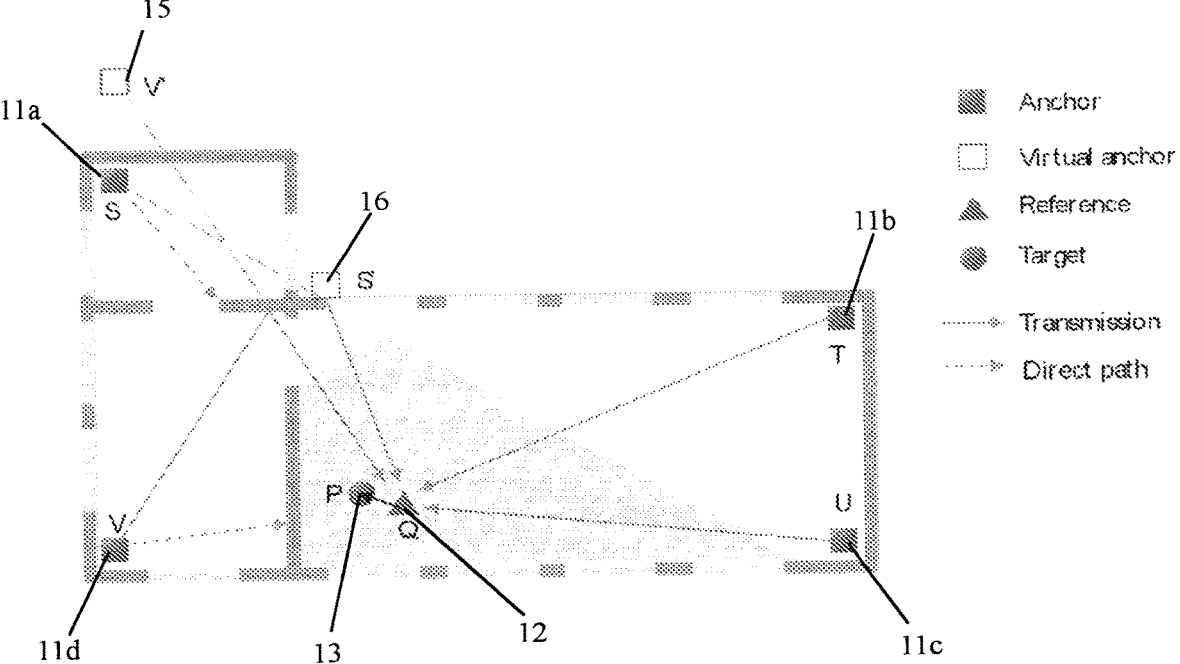
FIG. 5 depicts virtual sources providing signals for a local area of interest according to some example embodiments.

Furthermore, a model is created of the local variation of the phase double difference for a target such as target node 13 in the vicinity of the reference such as reference node 12. It is noted that as a result of multipath propagation, the model is likely to be different from a wide area model corresponding to the direct signal path from the original sources. In the example of FIG. 5, V' (with reference sign 15) is a virtual source arising from a reflection of a respective signal transmission, a reflection of the transmission of anchor 11d.

With respect to the FIG. 5, it is additionally noted that FIG. 5 shows anchors 11a, 11b, 11c, 11d, reference 12, and target 13. Furthermore, the shown virtual anchor 15 is the virtual one of anchor 11d, whereas the shown virtual anchor 16 is the virtual one of anchor 11a. FIG. 5 can be seen as an exemplary illustration of virtual sources providing signals for a local area of interest in a shaded configuration.

It is further noted that the model may have a region of applicability, over which the propagation conditions for the signals are reasonably consistent. The model may be described as a local phase difference gradient, based on magnitude and direction, relative to that at a reference point in the area of interest. Furthermore, the model may be generated from knowledge of the propagation, for example, from the geometry of the anchors or virtual anchors such as virtual anchor V of FIG. 5, respectively, and reference.

Figure 2A:
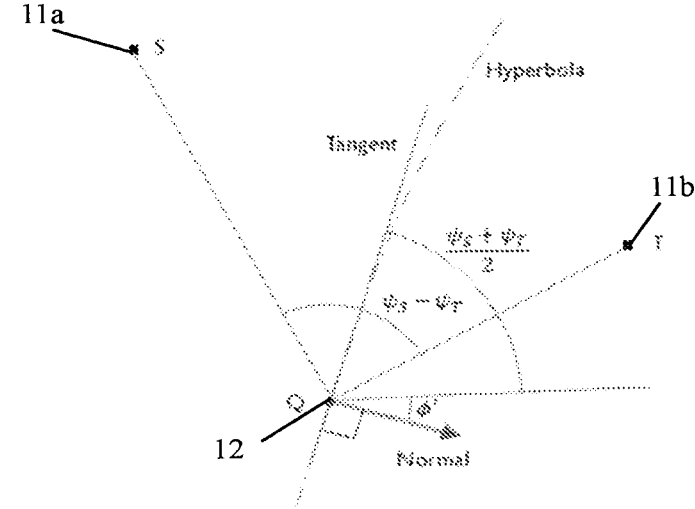
FIG. 2A shows geometry producing a variation gradient in the respective observed phase difference in the locality of a reference node according to some example embodiments.
Figure 2B:
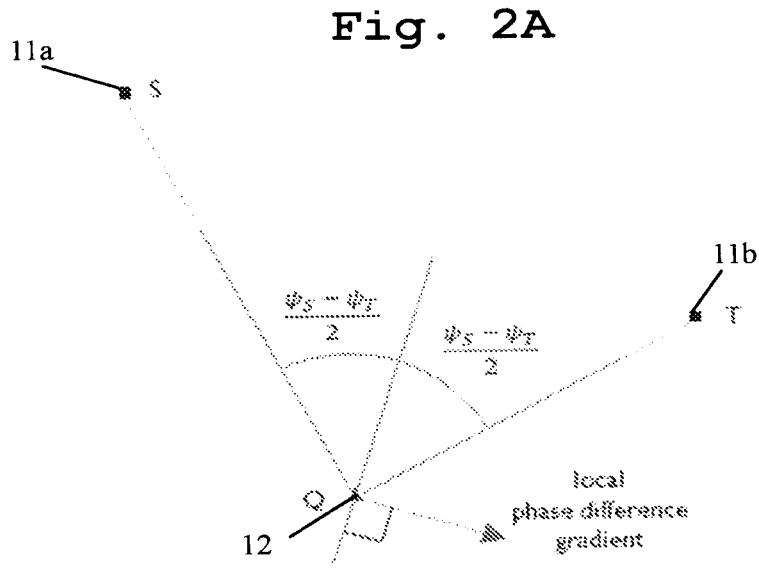
FIG. 2B illustrates the exemplary geometry of FIG. 2A in the context of the corresponding local phase difference gradient.

Exemplarily, for the geometry of FIG. 2A or FIG. 2B, respectively, it can be shown that in the vicinity of the reference Q the signals from two anchors or static nodes, respectively, S and T give a change gradient of the observed phase difference ($\zeta_{SQ} - \zeta_{TQ}$) that depends on the separation of the angles of incidence between the two signals, as given by $$\frac{\delta(\zeta_{SQ} - \zeta_{TQ})}{\delta h} = \frac{2\pi}{\lambda} 2 \sin\left(\frac{\psi_T - \psi_S}{2}\right)$$

for a change in location of distance h in the direction $$\phi' \approx \frac{\psi_S + \psi_T}{2} - \frac{\pi}{2}$$

which is the normal to the bisection of the angle to the directions of incidence of the two signals. This direction corresponds to the normal of a hyperbola passing through the reference and with the anchors as its foci.

With respect to the above-mentioned FIG. 2A and FIG. 2B, it is additionally noted that the geometry produces a variation gradient in the observed phase difference in the locality of node Q, as a result of the difference between the phase of signals from two sources S and T incident at angles $\psi_S$ and $\psi_T$. The hyperbola has foci S and T and passes through Q has a tangent at angle $\phi$ and normal $\phi'$. The direction and magnitude of the observed local phase difference gradient depends only on the directions of the incident signals at Q.

In this context, it is noted that the magnitude of the phase gradient may be continuous with the phase ambiguity of and the integer being unwrapped. In particular, for example, a measured phase difference of minus may become a measured phase difference of plus at an adjacent location.

In some example embodiments, it is noted that this model of the phase variation with position at a particular reference location does not depend on the distances to the sources, and that it depends only weakly on their location via the angle of incidence of the signal at the reference. This makes the positioning less dependent on errors in the anchors and makes the position relative to the reference precise, particularly in the close proximity of the reference. Moreover, the geometry and the distance to the sources may affect the regional variation of the phase difference gradient in the locality of interest.

Figure 3:
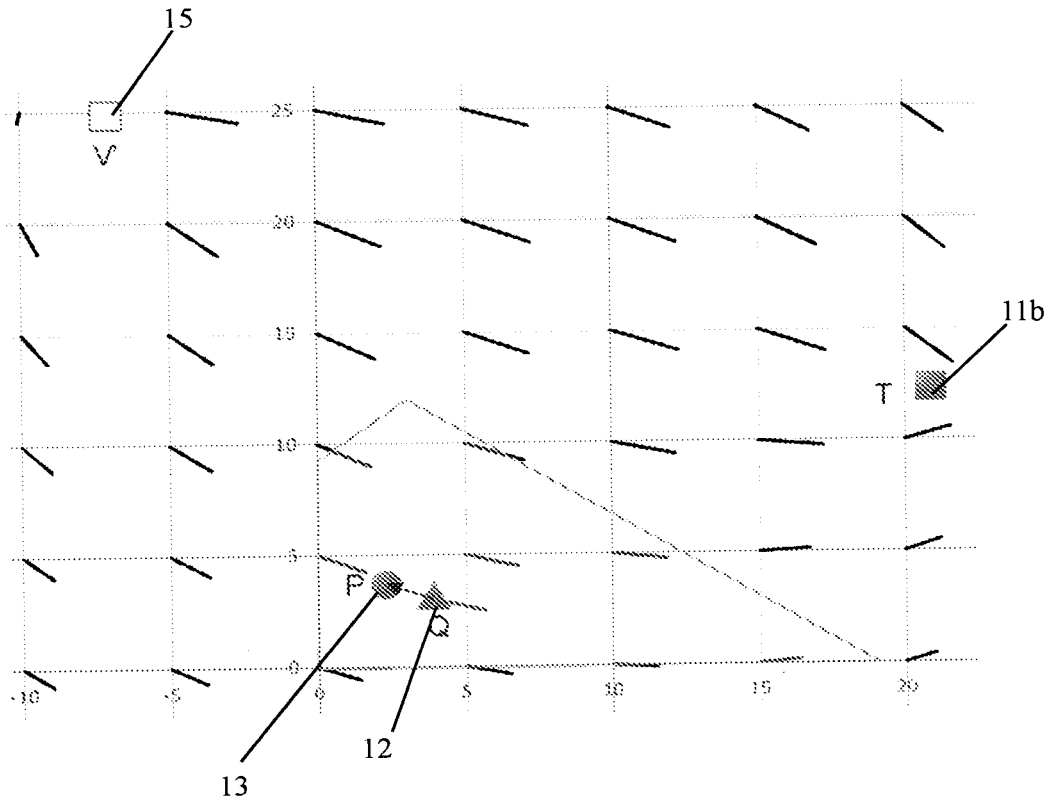
FIG. 3 shows a variation depending on location of phase difference gradient according to some example embodiments.

An example of the variation of the local phase difference gradient is illustrated in FIG. 3, which shows how the observed phase difference changes according to the node's location in the region of interest. The variation depends on location of the phase difference gradient in magnitude and direction that is applicable in the vicinity of the reference Q (with reference sign 12), that arises from the measurement and differencing of signals with a pair of sources. Additionally, FIG. 3 shows the anchor T (with reference sign 11b), the target P (with reference sign 13), and an exemplary virtual anchor V' (with reference sign 15).

According to FIG. 3, each line starting at a grid point shows the vector corresponding to the direction of the change in location that gives rise to the maximum change in the observed phase difference with the length of the line drawn to correspond to the magnitude of the measured phase change that results from a change of location of distance, for instance, one meter.

It is noted that the model may be prepared in advance as part of the installation, for example from a floor plan and ray-tracing, and/or from a measurement survey in the area of interest.

Further, the model may be created or updated from live estimation of the local environment and virtual source locations using Simultaneous Location and Mapping (SLAM) techniques. In some example embodiments the measured double difference may be combined with the model of the local variation of phase difference with position to provide information on the position of the target.

Figure 4:
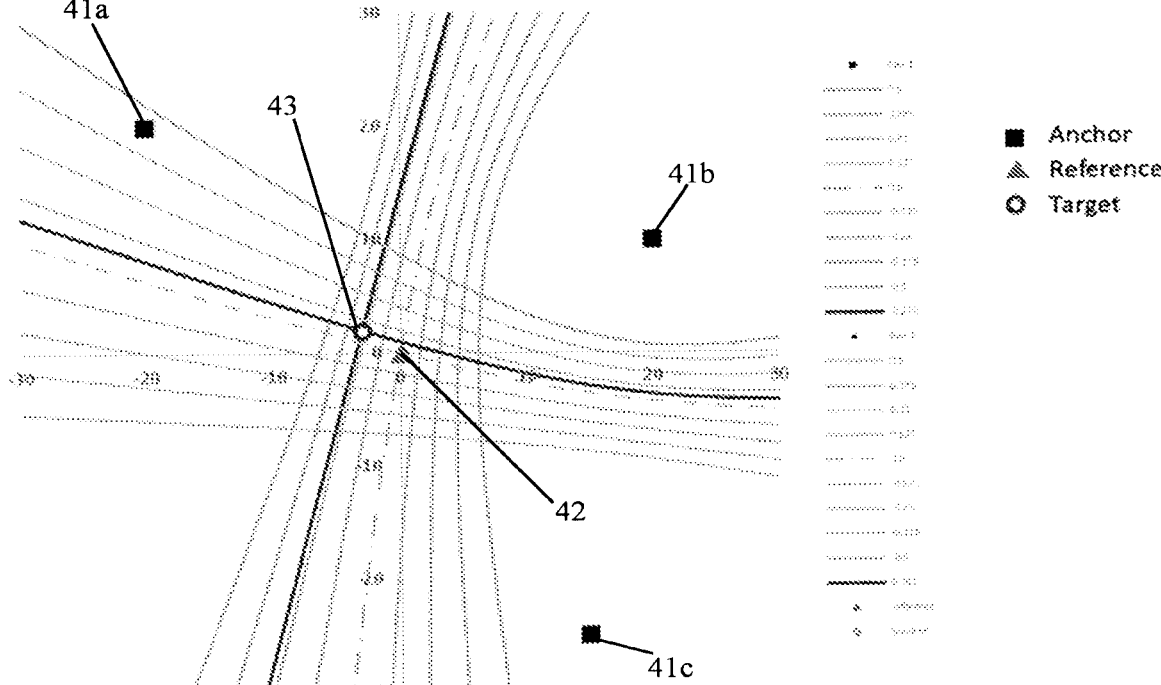
FIG. 4 shows positioning with phase differences relative to a reference according to some example embodiments.

In this context, for the sake of completeness, it is noted that the position information may be ambiguous, as the phase difference is over a range from $-\pi$ to $+\pi$ as illustrated in FIG. 4 with ambiguous solutions outside this range. FIG. 4 shows three anchor nodes 41a, 41b, 41c, a reference node 42, and a target node 43. In this exemplary case, positioning with phase differences relative to a reference with two pairs of anchors (one anchor being common) is illustrated.

Moreover, the resulting position information such as the location locus may be combined with other information to estimate the position. This other information may be from a further set of difference measurements as illustrated in FIG. 4. In this context, the position may be estimated within a local region with the difference metric relative to the local reference, and in some examples the locally applicable phase difference gradient magnitude and direction.

Additionally or alternatively, signal fragments may be measured by more than two receivers to contribute to the estimation of more than one phase difference between sources, and more than one location locus. The signal fragments can be reused, which is, for instance, very efficient and important for scalability. Further, a complete positioning system can be built out of multiple such phase difference measurements and information.

In further addition to this or as a further alternative, the other information may be from round trip time and/or phase measurements. This then provides range information. The position information may be combined with other position information from other measurements, means, and/or locus of position to estimate the most likely position of the target. These other measurement means may, for example, be time difference of arrival or two-way round trip ranging measurements, and/or geometrical constraints such as walls and corridors.

Figure 6:
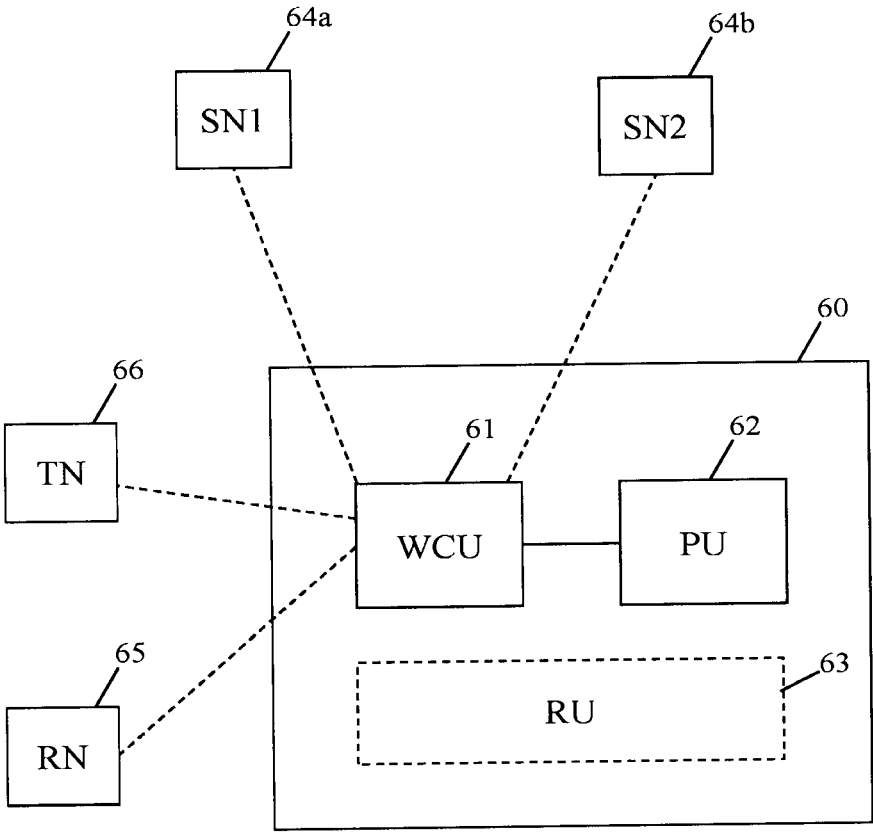
FIG. 6 shows another example embodiment.

Now, with respect to FIG. 6, a device 60 for estimating position information with respect to at least one target node, exemplarily target node 66, is shown. According to FIG. 6, the device 60 comprises a wireless communication unit 61, and a processing unit 62 connected to the wireless communication unit 61. In this context, the wireless communication unit 61 is configured to communicate with all of at least two static nodes, exemplarily the two static nodes 64a and 64b, being configured each as a source for wirelessly transmitting at least signal fragments, or each as a receiver for wirelessly receiving at least signal fragments.

In addition to this, the wireless communication unit 61 is further configured to communicate with all of at least one reference node, exemplarily reference node 65, and at least one target node, exemplarily target node 66, being configured each as a receiver for wirelessly receiving the signal fragments from the at least two sources in the case that all of the at least two static nodes are configured each as a source, or each as a source for wirelessly transmitting the signal fragments to the at least two receivers in the case that all of the at least two static nodes are configured each as a receiver.

Furthermore, the wireless communication unit 61 is further configured to configure the at least two receivers to measure the phases of a set of common signal fragments from the at least two sources. Moreover, the wireless communication unit 61 is further configured to receive the phase measurements of the at least two receivers.

Additionally, the processing unit 62 is configured to estimate position information with respect to the at least one target node or the target node 66, respectively, on the basis of the phase measurements of the at least two receivers. In some example embodiments, at least one of the at least one reference node may be embodied as a reference unit 63, wherein the device 60 comprises the reference unit 63.

Figure 7:
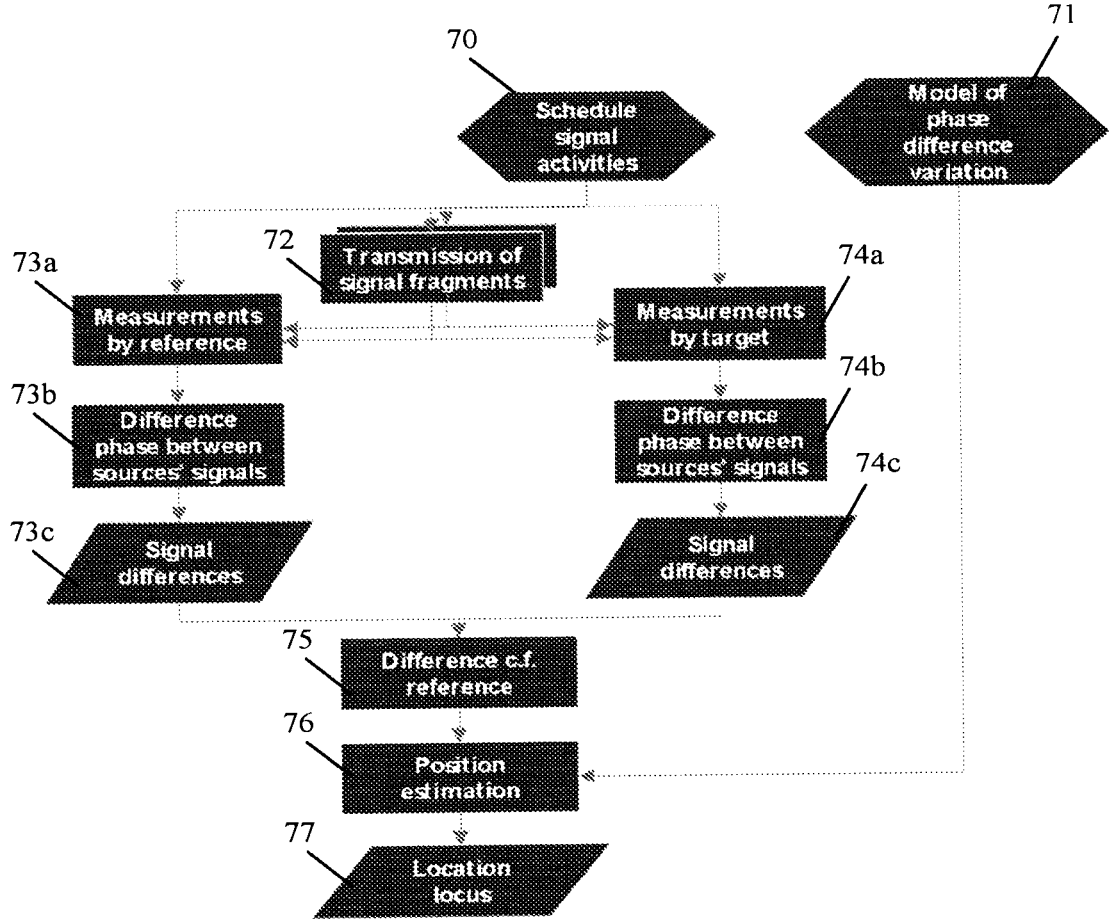
FIG. 7 shows another example embodiment.

Now, with respect to FIG. 7, exemplary steps in estimation of location information from differential phase measurements relative to the reference are illustrated in the sense of the invention. According to FIG. 7, respective signal activities are scheduled in step 70. After the scheduling, corresponding signal fragments are transmitted in step 72. In step 73a, measurements are performed by a reference node. In this exemplary case, the step 73a interacts with the above-mentioned steps 70 and 72.

Furthermore, in step 74a being performed in a parallel manner with respect to step 73, measurements are performed by a target node. In this exemplary case, the step 74a interacts with the above-mentioned steps 70 and 72. Moreover, in steps 73b and 73c following step 73a, phase differences between the respective sources' signals and signal differences are determined in the context of the measurements by the reference node.

As it can further be seen from FIG. 7, in steps 74b and 74c following step 74a, phase differences between the respective sources' signals and signal differences are determined in the context of the measurements by the target node. The results of the above-mentioned steps 73c and 74c may be performed in a parallel manner are then processed in step 75. Before the respective location locus is determined in the final step 77, a position estimation is performed according to step 76 on the basis of the results of the above-mentioned step 75 and step 71. The step 71 comprises providing a model of phase difference variation.

Figure 8:
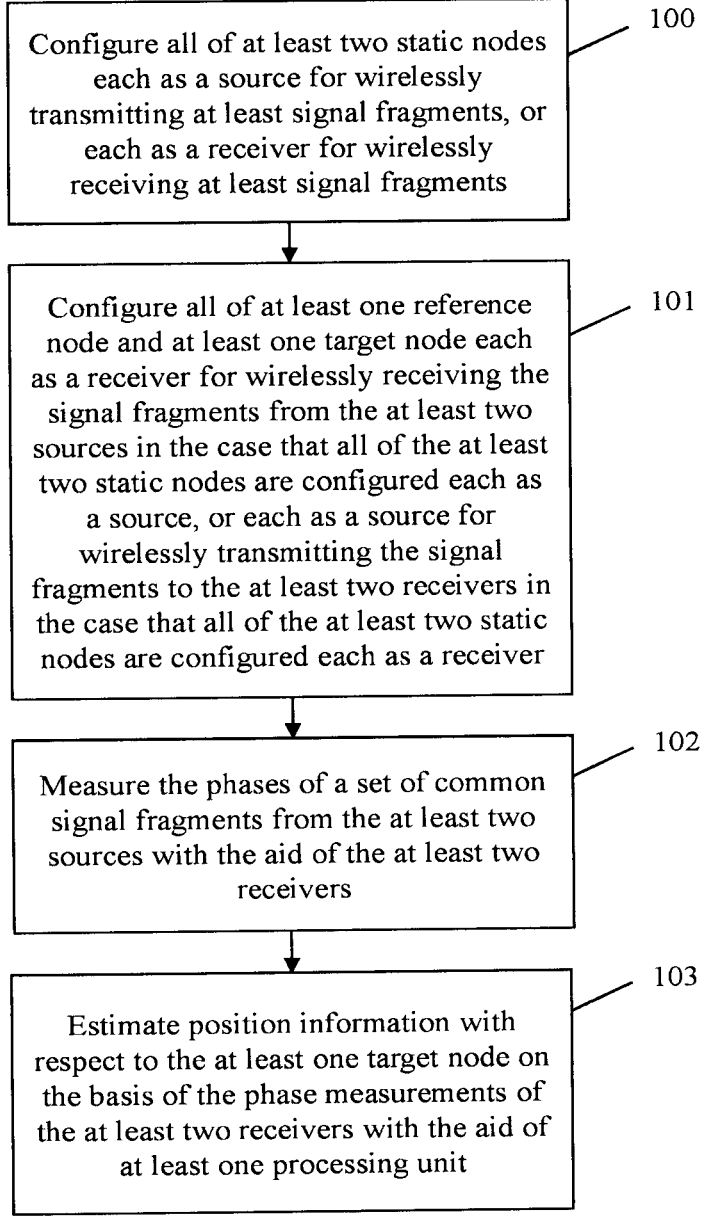
FIG. 8 shows another example embodiment as depicted in FIG. 7.

Finally, FIG. 8 shows a flow chart of an embodiment of the method for estimating position information with respect to at least one target node. In a first step 100, all of at least two static nodes are configured each as a source for wirelessly transmitting at least signal fragments, or each as a receiver for wirelessly receiving at least signal fragments. Then, in a second step 101, all of at least one reference node and the at least one target node are configured each as a receiver for wirelessly receiving the signal fragments from the at least two sources in the case that all of the at least two static nodes are configured each as a source, or each as a source for wirelessly transmitting the signal fragments to the at least two receivers in the case that all of the at least two static nodes are configured each as a receiver. Furthermore, in a third step 102, the phases of a set of common signal fragments from the at least two sources are measured with the aid of the at least two receivers. Moreover, in a fourth step 103, position information with respect to the at least one target node is estimated on the basis of the phase measurements of the at least two receivers with the aid of at least one processing unit.

While various disclosed embodiments have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for estimating position information, the system comprising:
   at least two static nodes,
   at least one reference node,
   at least one target node, and
   at least one processing unit,
   wherein at least two of the at least two static nodes are configured each as a source for wirelessly transmitting at least signal fragments, or each as a receiver for wirelessly receiving at least signal fragments, and with respect to the signal fragments, a signal fragment is a discontinuous part of a transmission sequence, wherein a signal fragment has an uncertain or unknown phase relative to other signals or signal fragments,
   wherein at least two of the at least one reference node and the at least one target node are configured each as a receiver for wirelessly receiving the signal fragments from the at least two sources in the case that at least two of the at least two static nodes are configured each as a source, or each as a source for wirelessly transmitting the signal fragments to the at least two receivers in the case that at least two of the at least two static nodes are configured each as a receiver,
   wherein the at least two receivers are configured to measure the phases of a set of common signal fragments from the at least two sources, and
   wherein the at least one processing unit is configured to estimate position information with respect to the at least one target node on the basis of the phase measurements of the at least two receivers.

2. The system according to claim 1,
   wherein at least a part of the phase measurements is based on the modulation of a corresponding signal, the difference in corresponding subcarriers, or the carrier of a corresponding signal.

3. The system according to claim 1,
   wherein at least a part of the phase measurements is based on a multipath component.

4. The system according to claim 1,
   wherein the at least one processing unit is configured to subtract the phase measurements for forming differences between the corresponding signals from the at least two sources and/or between the at least two receivers in order to remove the effect of respective time and/or phase offsets.

5. The system according to claim 4,
   wherein forming the differences results in a metric with a known ambiguity range.

6. The system of claim 5, wherein the metric with the known ambiguity range is a metric of the corresponding phase difference.

7. The system according to claim 1,
   wherein the at least two sources and/or the at least two receivers are configured to operate on the same frequency, and/or
   wherein the signal fragments are unsynchronized with respect to each other.

8. The system according to claim 1,
   wherein the at least one reference node and/or the at least one target node and/or at least one of the at least two static nodes comprises the at least one processing unit.

9. The system according to claim 1,
   wherein at least one of the at least two static nodes comprises or is a beacon or an anchor or an access point, and/or
   wherein at least one of the least one reference node and the at least one target node comprises or is a mobile or movable node.

10. The system according to claim 1,
   wherein, on the basis of the phase measurements regarding the at least two static nodes and the at least one reference node, the at least one processing unit is configured to create a model of the corresponding local phase variation for the at least one target node in the vicinity of the at least one reference node.

11. The system according to claim 10,
   wherein the model is described as a local phase difference gradient.

12. The system according to claim 11,
   wherein the at least one processing unit is configured to use the model in the context of estimating the position information, relative position information of the at least one target node with respect to the at least one reference node.

13. The system according to claim 10,
   wherein the at least one processing unit is configured to use the model in the context of estimating the position information, relative position information of the at least one target node with respect to the at least one reference node.

14. A device for estimating position information with respect to at least one target node, the device comprising:
   a wireless communication unit, and
   a processing unit connected to the wireless communication unit,
   wherein the wireless communication unit is configured to communicate with at least two of at least two static nodes being configured each as a source for wirelessly transmitting at least signal fragments, or each as a receiver for wirelessly receiving at least signal fragments, and with respect to the signal fragments, a signal fragment is a discontinuous part of a transmission sequence, wherein a signal fragment has an uncertain or unknown phase relative to other signals or signal fragments,
   wherein the wireless communication unit is further configured to communicate with at least two of at least one reference node and at least one target node being configured each as a receiver for wirelessly receiving the signal fragments from the at least two sources in the case that at least two of the at least two static nodes are configured each as a source, or each as a source for wirelessly transmitting the signal fragments to the at least two receivers in the case that at least two of the at least two static nodes are configured each as a receiver,
   wherein the wireless communication unit is further configured to configure the at least two receivers to measure the phases of a set of common signal fragments from the at least two sources, wherein the wireless communication unit is further configured to receive the phase measurements of the at least two receivers, and wherein the processing unit is configured to estimate position information with respect to the at least one target node on the basis of the phase measurements of the at least two receivers.

15. The device according to claim 14, wherein at least one of the at least one reference node is embodied as a reference unit, wherein the device comprises the reference unit.

16. A method for estimating position information with respect to at least one target node, the method comprising the steps of:

configuring at least two of at least two static nodes each as a source for wirelessly transmitting at least signal fragments, or each as a receiver for wirelessly receiving at least signal fragments, and with respect to the signal fragments, a signal fragment is a discontinuous part of a transmission sequence, wherein a signal fragment has an uncertain or unknown phase relative to other signals or signal fragments, configuring at least two of at least one reference node and the at least one target node each as a receiver for wirelessly receiving the signal fragments from the at least two sources in the case that at least two of the at least two static nodes are configured each as a source, or each as a source for wirelessly transmitting the signal fragments to the at least two receivers in the case that at least two of the at least two static nodes are configured each as a receiver, measuring the phases of a set of common signal fragments from the at least two sources with the aid of the at least two receivers, and estimating position information with respect to the at least one target node on the basis of the phase measurements of the at least two receivers with the aid of at least one processing unit.

17. The method according to claim 16, wherein at least a part of the phase measurements is based on the modulation of a corresponding signal, the difference in corresponding subcarriers, or the carrier of a corresponding signal.

18. The method according to claim 17, wherein at least a part of the phase measurements is based on a multipath component.

19. The method according to claim 16, further comprising the steps of:

subtracting the phase measurements for forming differences between the corresponding signals from the at least two sources and/or between the at least two receivers in order to remove the effect of respective time and/or phase offsets.

20. The method according to claim 19, wherein forming the differences results in a metric with a known ambiguity range.

* * * * *